United States Patent
Gogolla et al.

(10) Patent No.: US 7,548,829 B2
(45) Date of Patent: Jun. 16, 2009

(54) HAND-HELD PULSE LASER DISTANCE MEASURING DEVICE

(75) Inventors: Torsten Gogolla, Schaan (LI); Andreas Winter, Rankweil (AT); Helmut Seifert, Serba (DE)

(73) Assignee: Hilti Aktiengesellschaft, Schaan (LI)

(*) Notice: Subject to any disclaimer, the term of this patent is extended or adjusted under 35 U.S.C. 154(b) by 48 days.

(21) Appl. No.: 11/304,934

(22) Filed: Dec. 14, 2005

(65) Prior Publication Data

US 2006/0142969 A1 Jun. 29, 2006

(30) Foreign Application Priority Data

Dec. 16, 2004 (DE) .................. 10 2004 060 622

(51) Int. Cl.
*G01B 5/14* (2006.01)

(52) U.S. Cl. ................................ 702/158

(58) Field of Classification Search ............ 702/57, 702/79, 97, 104, 110, 111, 116, 117, 141, 702/149, 158, 159, 179, 190, 191, 169; 356/5.01, 356/5.05, 5.07, 5.11; 367/99
See application file for complete search history.

(56) References Cited

U.S. PATENT DOCUMENTS

| | | | | |
|---|---|---|---|---|
| 4,299,484 A | * | 11/1981 | Holzapfel | 356/5.1 |
| 4,521,107 A | | 6/1985 | Chaborski et al. | |
| 4,694,339 A | * | 9/1987 | Fenster et al. | 348/536 |
| 4,699,508 A | * | 10/1987 | Bolkow et al. | 356/5.07 |
| 4,738,529 A | | 4/1988 | Hug | |
| 5,075,878 A | * | 12/1991 | Ohtomo et al. | 702/176 |
| 5,619,317 A | * | 4/1997 | Oishi et al. | 356/5.05 |
| 5,701,006 A | * | 12/1997 | Schaefer | 250/227.16 |
| 5,805,527 A | * | 9/1998 | Hoashi et al. | 367/99 |
| 6,369,880 B1 | * | 4/2002 | Steinlechner | 356/5.11 |
| 6,917,415 B2 | * | 7/2005 | Gogolla et al. | 356/5.06 |

(Continued)

FOREIGN PATENT DOCUMENTS

DE   3103567 A1   8/1982

(Continued)

OTHER PUBLICATIONS

Fang et al. "Noise reduction in lidar signal based on discrete wavelet transform", Sep. 15, 2004, Optics communications 233, pp. 67-76.*

(Continued)

*Primary Examiner*—Edward Raymond
*Assistant Examiner*—Mohamed Charioui
(74) *Attorney, Agent, or Firm*—Abelman, Frayne & Schwab

(57) ABSTRACT

A hand-held pulse laser distance measuring device (1) with an algorithm (3) which controls a microcontroller (2) and which serves to calculate the distance (X) to a measurement object (4) by a time difference ($\tau$) between a measurement pulse (6) and a reference pulse (7) and with a superimposition module (5) which calculates the time difference ($\tau$) of a plurality of repeated pulse trains which are periodically superimposed with a trigger frequency $f_{TRIGGER}$, wherein the trigger frequency $f_{TRIGGER}$ lies in the frequency range of $$0.7 \cdot \frac{2}{2 \cdot m - 1} \cdot f_{INT} < f_{TRIGGER} < 1.3 \cdot \frac{2}{2 \cdot m - 1} \cdot f_{INT}, \text{ where } m = 1, 2, 3, \ldots$$

at an interference frequency $f_{INT}$=100 Hz . . . 120 Hz; and a measuring method for the pulse laser distance measuring device.

4 Claims, 2 Drawing Sheets

U.S. PATENT DOCUMENTS 6,989,782 B2 * 1/2006 Walker et al. ............... 342/134
2004/0207409 A1 * 10/2004 Ariav et al. ................. 324/642

FOREIGN PATENT DOCUMENTS

DE          3429062 A1    2/1986
DE          10112833 C1   3/2003

OTHER PUBLICATIONS

User manual excerpt entitled "Lindy Computer Connection Technology", Second Edition, Oct. 2003, describing the Lindy article No. 32887, which is a Universal Serial Bus (USB) MiniCam.

* cited by examiner

HAND-HELD PULSE LASER DISTANCE MEASURING DEVICE

BACKGROUND OF THE INVENTION

1. Field of the Invention

The invention is directed to a hand-held pulse laser distance measuring device, in particular a hand-held construction laser distance measuring device.

2. Description of the Prior Art

In the building industry, distances must be exactly determined with an accuracy of within a few mm at a range of up to several hundreds of meters distance. The hand-held laser distance measuring devices which are suitably constructed for this purpose and to which the present invention is directed use a pulse measurement method with a modulated visible laser beam for measuring distance. Artificial light sources operating at 50 Hz AC oscillate in intensity with a frequency $f_{INT}$ of 100 Hz and at 60 Hz AC with a frequency $f_{INT}$ of 120 Hz. This frequency doubling is brought about because the intensity maximum occurs at both the positive maximum and negative maximum of the alternating current. This alternating component of the frequency $f_{INT}$ is detected, along with the measurement light pulses and reference light pulses, as an interference signal by the photodiode and is sampled by the analog-to-digital converter. It leads to measurement errors in distance measurement.

DE3103567C2 introduces a method for direct measurement of the light pulse time-of-flight in which a measurement light pulse traveling over the measurement distance and a reference light pulse traveling over the reference distance are detected by the same photodetector. The detected measurement light pulse and reference light pulse start and stop a time measurement system, e.g., a fast counter. The measurement distance is determined definitively by direct and definitive measurement of the time difference between the detection of the reference light pulse and the detection of the measurement light pulse.

According to DE3429062C2, a device of the type mentioned above for measuring the time of flight of light waves has a superimposition module in which triggered individual measurements and measurement light pulses and reference light pulses are periodically superimposed and accordingly accumulated.

DE 10112833C1 discloses a hand-held laser distance measuring device with a pulse reflection mixing method. The detection pulse train detected by the light detector or, in case of separate light detectors, the reference pulse train on the one hand and the measurement pulse train on the other hand are preferably directly subjected to direct mixing in the respective light detector followed by low-pass filtering. The direct mixing is controlled by a LO pulse train which is locally generated at the measurement point and whose duty factor is equal to, or approximately equal to, the duty factor of the measurement pulse train and whose repetition frequencies are selected so as to differ slightly. Accordingly, the mixing pulse repetition frequency $f_{MIX}$ of the low-frequency pulse train corresponds to the amount of the difference between the pulse repetition frequency f of the transmission pulse train and measurement pulse train on the one hand and the pulse repetition frequency of the local oscillator pulse train $f_{LO}$ on the other hand. Therefore: $f_{MIX}=|f-f_{LO}|$. Like the high-frequency detection pulse train, the low-frequency pulse train likewise comprises reference pulses and measurement pulses whose time delay is a measure of the distance. For further particulars, the person skilled in the art is referred to the above-cited document, whose disclosure is explicitly incorporated herein in its entirety.

It is the object of the invention to realize a hand-held laser distance measuring device with pulse reflection mixing having enhanced protection against interference.

SUMMARY OF THE INVENTION

This and other objects of the present invention which will become apparent hereinafter, are achieved by providing a hand-held pulse laser distance measuring device having an algorithm which controls a microcontroller and which serves to calculate the distance to a measurement object by a time difference between a measurement pulse and a reference pulse has a superimposition module which calculates the time difference of a plurality of repeated pulse trains from the periodic superposition with a trigger frequency $f_{TRIGGER}$ which lies in the frequency range of $$0.7 \cdot \frac{2}{2 \cdot m - 1} \cdot f_{INT} < f_{TRIGGER} < 1.3 \cdot \frac{2}{2 \cdot m - 1} \cdot f_{INT}, \text{ where } m = 1, 2, 3, \ldots$$

at an interference frequency $f_{INT}$=100 Hz . . . 120 Hz.

In the step preceding the calculation of the distance from a time difference between a measurement pulse and a reference pulse, the associated measuring method has a superimposition step which periodically superimposes a plurality of repeated pulse trains with a trigger frequency $f_{TRIGGER}$. At an interference frequency $f_{INT}$=100 Hz . . . 120 Hz, this trigger frequency $f_{TRIGGER}$ lies in the following frequency range:

$$0.7 \cdot \frac{2}{2 \cdot m - 1} \cdot f_{INT} < f_{TRIGGER} < 1.3 \cdot \frac{2}{2 \cdot m - 1} \cdot f_{INT}, \text{ where } m = 1, 2, 3, \ldots$$

In theory, the influence of the interference signal can be completely compensated in that the following equation is given for the trigger frequency $f_{TRIGGER}$ which initiates a sampling cycle of the pulse train affected by an interference frequency $f_{INT}$:

$$f_{TRIGGER} - \frac{2}{2 \cdot m - 1} \cdot f_{INT}, \text{ where } m = 1, 2, 3, \ldots$$

In this way, the interference signal undergoes a phase displacement of 180 degrees with respect to two successive sampling cycles of repeating pulse trains. When m=1, the trigger frequency is twice the amount of the interference frequency and, for example, the positive half-wave of the interference signal is detected in a first sampling cycle and the negative half-wave of the interference signal is detected in a second sampling cycle. The interference signal is compensated by superimposing the two pulse trains. Generally, the compensation of the interference signal is achieved in an even number of superimpositions. In practice, the above condition need not be met exactly and a deviation of ±30% from the optimal trigger frequency is acceptable, so that interference caused by the European AC frequency of 50 Hz and also by the U.S. AC frequency of 60 Hz can be compensated by a trigger frequency from the above frequency range.

A pulse reflection mixing method is advantageously used as measurement method, wherein a low-frequency pulse train generated by mixing with the mixing pulse repetition frequency $f_{MIX}$ corresponds to the trigger frequency $f_{TRIGGER}$ or to an integral multiple thereof. Accordingly:

$$f_{MIX} = F_{TRIGGER} \cdot n, \text{ where } n = 1, 2, 3, \ldots,$$

so that, with a pulse reflection mixing method suitable for highly accurate measurements of distance over large distances, it is also ensured that the signal proportion of the low-frequency pulse train is superimposed in correct phase when averaging the sampling signals.

The trigger frequency $f_{TRIGGER}$ advantageously corresponds to the mixing pulse repetition frequency $f_{MIX}$ so that the trigger signal can be derived directly from the low-frequency pulse train.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show.

DETAILED DESCRIPTION OF THE PREFERRED EMBODIMENT

Figure 1:
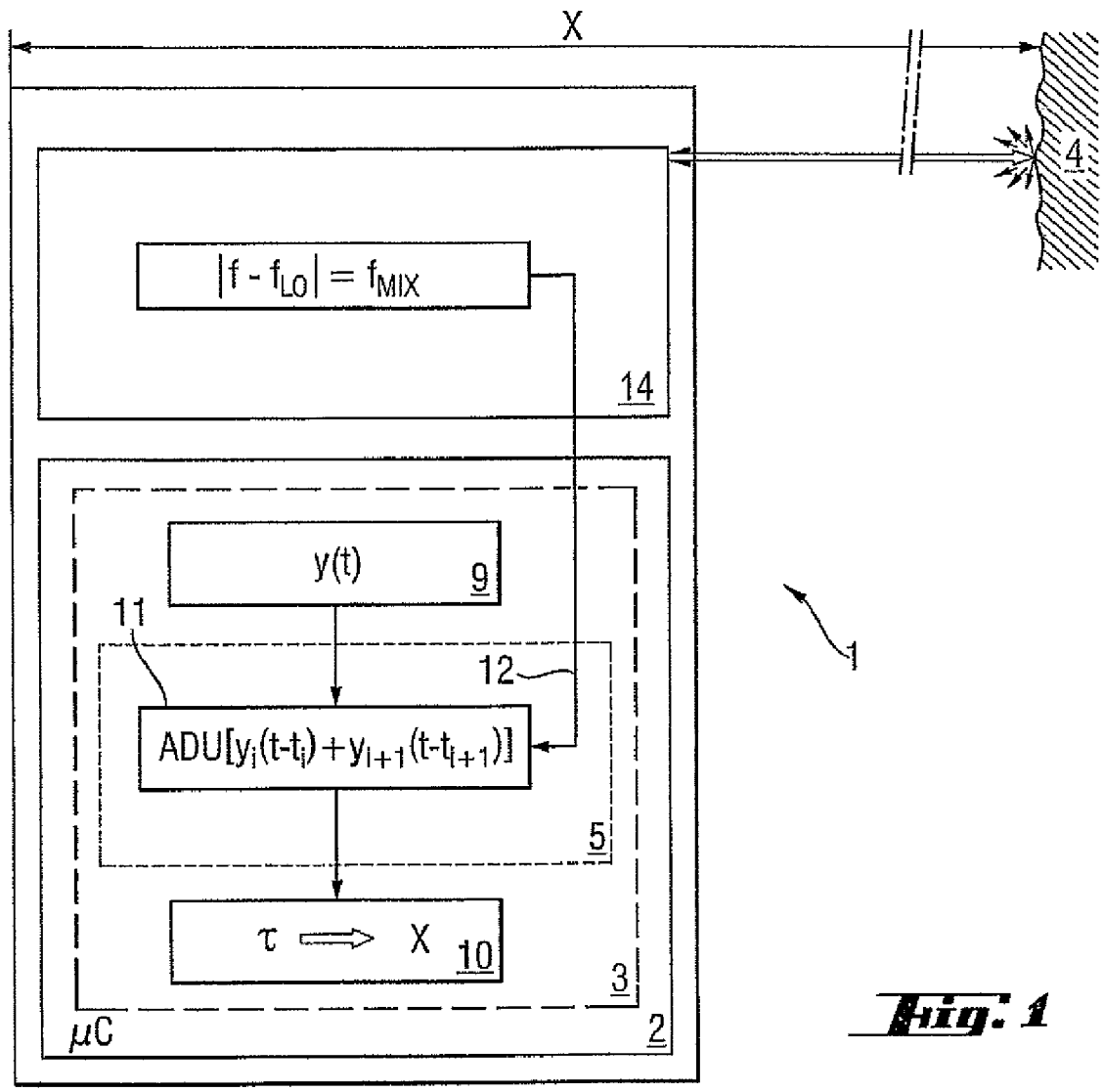
FIG. 1 a schematic view of a hand-held laser distance measuring device with algorithm.
Figure 2:
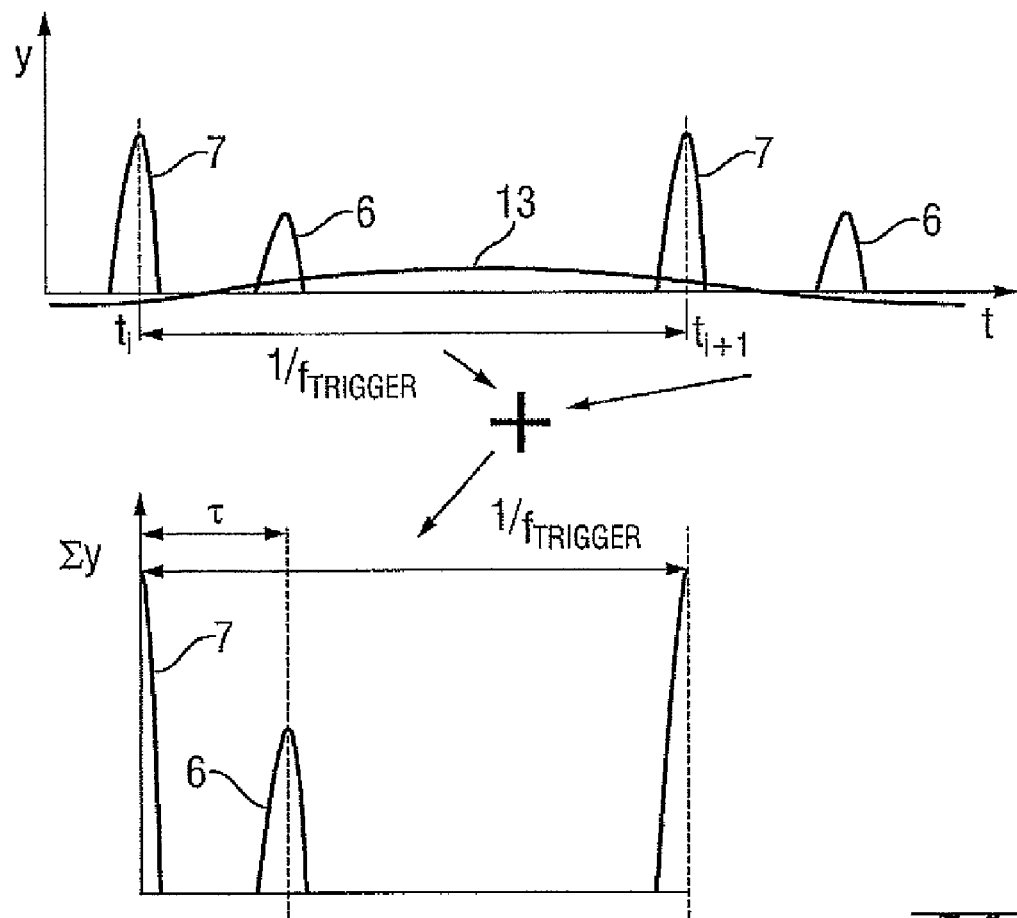
FIG. 2 a repeatedly periodically superimposed pulse train in normalized time scale.

According to FIG. 1 and FIG. 2, a hand-held laser distance measuring device 1, shown schematically, with pulse reflection mixing has a light detector 14 and a microcontroller 2. The light detector 14 is configured for detecting a measurement pulse 6 reflected from a measurement object 4, for detecting a reference pulse 7, and for generating a mixing pulse train by mixing the measurement pulse 6 with a local oscillator pulse train whose repetition frequency differs from the repetition frequency of the measurement pulse 6. The light detector 14 also determines a low-frequency mixing pulse repetition frequency $f_{MIX}$ generated in a pulse reflection mixing method as follows:

$$f_{MIX} = |f - f_{Lo}|$$

in which $f_{Lo}$ is a frequency of a LO pulse train which controls the direct mixing, as described in DE10112833C1. The microcontroller 2 has a superimposition module 5 and an algorithm 3 which controls the microcontroller 2 and which serves to calculate the distance X to a measurement object 4 from a time difference τ between the measurement pulse 6 and the reference pulse 7, with the time difference τ being calculated by the superimposition module 5.

The measurement of a time-dependent pulse train y(t) with measurement pulses 6 and reference pulses 7 is carried out in this algorithm 3 with a measurement step 9. In a subsequent calculation step 10, the distance X is calculated from the time difference τ between the measurement pulse 6 and the reference pulse 7. In a superimposition step 11 of a superimposition module 5 of the algorithm 3 between the measurement step 9 and the calculation step 10, two successive pulse trains $y_i(t-t_i) y_{i+1}(t-t_{i+1})$ which are repeated with a trigger frequency $f_{TRIGGER}$ are periodically superimposed during sampling by an analog-to-digital converter ADU. By mixing a pulse repetition frequency f=100 MHz with a pulse repetition frequency of the local oscillator pulse train $f_{LO}$=100.00022 MHz using the pulse reflection mixing method, a low-frequency mixing pulse repetition frequency $f_{MIX}$=220 Hz is generated which is used, in addition, directly as a trigger signal 12. With an index m=1, its trigger frequency $f_{TRIGGER}$=220 Hz lies in the middle of the following frequency range:

$$0.7 \cdot \frac{2}{2 \cdot m - 1} \cdot f_{INT} < f_{TRIGGER} < 1.3 \cdot \frac{2}{2 \cdot m - 1} \cdot f_{INT}, \text{ where } m = 1, 2, 3, \ldots$$

for suppressing interference 13 of a mean interference frequency $f_{INT}$=110 Hz, such as occurs in artificial light sources operated in the AC supply system, in the accumulated sum signal Σy from which the time difference τ between the measurement pulse 6 and the reference pulse 7 is determined for calculating the distance X.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:
1. A measuring method for a hand-held pulse laser distance measuring device (1), the measuring method comprising the steps of:
providing a light detector (14) configured for detecting a measurement pulse (6) reflected from a measurement object (4), for detecting a reference pulse (7), and for generating a mixing pulse train by mixing the measurement pulse (6) with a local oscillator pulse train whose repetition frequency differs from the repetition frequency of the measurement pulse (6);and
providing a microcontroller (2) with a superimposition module (5) and an algorithm (3) which controls the microcontroller (2) and which serves to calculate and display to a user, from the hand-held pulse laser distance measuring device, in step (10), a distance (X) to a measurement object (4) by the superimposition module (5) using a time difference (τ) between the measurement pulse (6) and reference pulse (7), wherein during the calculation step (10) the measurement of the distance (X) is stored in the microcontroller (2), wherein the calculation of the distance (X) from the time difference (τ) is preceded by a superimposition step (11) using the superimposition module (5) which superimposes a plurality of repeated pulse trains which are repeated with a trigger frequency $f_{TRIGGER}$ to the mixing pulse train from the light detector (14), and wherein the trigger frequency $f_{TRIGGER}$ lies in the following frequency range at an interference frequency $f_{INT}$ = 120 Hz:

$$0.7 \cdot \frac{2}{2 \cdot m - 1} \cdot f_{INT} < f_{TRIGGER} < 1.3 \cdot \frac{2}{2 \cdot m - 1} \cdot f_{INT},$$

$$\text{where } m = 1, 2, 3, \ldots \text{ ;}$$

thereby the distance (X) is calculated and displayed with protection from any interference by light emitted from an external artificial light source by compensating for the interference from the light emitted from the external artificial light source and arriving at the hand-held pulse laser distance measuring device.

2. A measuring method according to claim 1 wherein the plurality of repeated pulse trains are generated from a low-frequency mixing pulse repetition frequency ($f_{MIX}$) generated in a pulse reflection mixing method; and wherein the value of the frequency ($f_{MIX}$) is equal to the value of an integral multiple of the trigger frequency $f_{TRIGGER}$.

3. A measuring method according to claim 2 wherein the value of the trigger frequency $f_{TRIGGER}$ is equal to the value of the low-frequency mixing pulse repetition frequency ($f_{MIX}$).

4. A hand-held pulse laser distance measuring device comprising:

a light detector (14) configured for detecting a measurement pulse (6) reflected from a measurement object (4), for detecting a reference pulse (7), and for generating a mixing pulse train by mixing the measurement pulse (6) with a local oscillator pulse train whose repetition frequency differs from the repetition frequency of the measurement pulse (6); and a microcontroller (2) including a superimposition module (5) and an algorithm (3) which controls the microcontroller (2) and which serves to calculate and display to a user, from the hand-held pulse laser distance measuring device, a distance (X) to a measurement object (4) by a time difference ($\tau$) between the measurement pulse (6) and the reference pulse (7) and wherein the superimposition module (5) superimposes a plurality of repeated pulse trains which are repeated with a trigger frequency $f_{TRIGGER}$ to the mixing pulse train from the light detector (14), wherein the trigger frequency $f_{TRIGGER}$ lies in the frequency range of $$0.7 \cdot \frac{2}{2 \cdot m - 1} \cdot f_{INT} < f_{TRIGGER} < 1.3 \cdot \frac{2}{2 \cdot m - 1} \cdot f_{INT}, \text{ where } m = 1, 2, 3, \ldots$$

at an interference frequency $f_{INT}=120$ Hz, and wherein the superimposition module (5) calculates the time difference ($\tau$) between the measurement pulse (6) and the reference pulse (7);

thereby the distance (X) is calculated and displayed with protection from any interference by light emitted from an external artificial light source by compensating for the interference from the light emitted from the external artificial light source and arriving at the hand-held pulse laser distance measuring device.

* * * * *